United States Patent
Kang et al.

(10) Patent No.: US 7,181,087 B2
(45) Date of Patent: Feb. 20, 2007

(54) METHOD AND APPARATUS FOR CONVERTING BRIGHTNESS LEVEL OF IMAGE

(75) Inventors: Ki-min Kang, Seoul (KR); Won-kyoung Cho, Jeollabuk-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 847 days.

(21) Appl. No.: 10/309,328

(22) Filed: Dec. 4, 2002

(65) Prior Publication Data

US 2003/0189729 A1    Oct. 9, 2003

(30) Foreign Application Priority Data

Apr. 9, 2002    (KR) ............................... 2002-19296

(51) Int. Cl.
  *G06K 9/38*    (2006.01)
  *G06K 15/00*   (2006.01)
(52) U.S. Cl. ..................... 382/270; 358/3.22
(58) Field of Classification Search ................ 382/270, 382/271; 358/3.14, 3.15, 3.22, 3.23
  See application file for complete search history.

(56) References Cited

U.S. PATENT DOCUMENTS

| 5,535,019 A | 7/1996 | Eschbach |
| 5,917,614 A | 6/1999 | Levien |
| 6,160,921 A | 12/2000 | Marcu |
| 6,671,068 B1 * | 12/2003 | Chang et al. ............... 358/1.9 |
| 6,842,267 B1 * | 1/2005 | Morimatsu ............... 358/3.03 |

\* cited by examiner

*Primary Examiner*—Vikkram Bali
*Assistant Examiner*—Colin LaRose
(74) *Attorney, Agent, or Firm*—Staas & Halsey LLP

(57) ABSTRACT

An image brightness level conversion method and apparatus which converts a multi-valued brightness level of an input pixel to a bi-valued brightness level using a threshold value. If the input pixel is determined to belong to an edge area, a predetermined reasonable distance by which dots should be isolated is reduced by a noise component and the threshold value is produced using the reduced distance. If the input pixel is determined not to belong to the edge area, the threshold value is produced without using the noise component. The method provides a uniform distribution of dots on the 2-dimensional space, a decrease in a generation of a void region where no dots appear around the edge area, a reduction of unpleasant appearing fixed patterns between dots, and a decrease in the generation of a typical pattern in which dots with a same color are diagonally arrayed.

16 Claims, 6 Drawing Sheets

METHOD AND APPARATUS FOR CONVERTING BRIGHTNESS LEVEL OF IMAGE

CROSS-REFERENCE TO RELATED APPLICATIONS

This application claims the benefit of Korean Application No. 2002-19296 filed Apr. 9, 2002, in the Korean Intellectual Property Office, the disclosure of which is incorporated herein by reference.

BACKGROUND OF THE INVENTION

1. Field of the Invention

The present invention relates to image processing, and more particularly, to a method and apparatus for converting a brightness level of an image into a bi-valued brightness level.

2. Description of the Related Art

Binarization is needed, for example, to convert input image data having one (hereinafter, a multi-valued brightness level) of 256 brightness levels expressed in an 8 bit system into output image data having a black or white brightness level (hereinafter, referred to as a bi-valued brightness level).

Conventional binarization methods include an error diffusion method, as described, for example, in "An Adaptive Algorithm for Spatial Grayscale" by R. Floyd and L. Steinberg, Processings of the SID Vol. 17(2), 75–77 (1976) or in Kang, Harry R., editor, Digital Color Halftoning, Peerless Systems Corporation, SPIE Optical Engineering Press. The error diffusion method modifies a multi-valued brightness level [x(m,n)] to determine a modified brightness level [u(m,n)], and compares the modified brightness level [u(m,n)] against a threshold value [T(m,n)] to determine a bi-valued brightness level [y(m,n)]. Here, m and n correspond to an input pixel and indicate a position of a dot that is expressed on output image data. An input pixel has a multi-valued brightness level [x(m,n)] and is expressed by input image data. A weight value [w(k,l)] is reflected to an error value between u(m,n) and y(m,n) to obtain a modified multi-valued brightness level [u(m,n)]. This error diffusion method causes a worm artifact, which is a particular worm-shaped pattern unpleasant to the eye in a bright multi-valued brightness level, and a start-up artifact. The error diffusion method also causes artifacts having directivity in an intermediate multi-valued brightness level. Indices for estimating the performance of binarization include a factor of homogeneity of dots expressed on output image data, a frequency of generating specific artifacts unpleasant to the eye, and/or a factor of a reduction of slow response that dots appear slowly around where the brightness changes rapidly.

Other conventional brightness level conversion methods for binarization include U.S. Pat. No. 5,535,019 to Eschbach, U.S. Pat. No. 6,160,921 to Marcu and U.S. Pat. No. 5,917,614 to Levien.

U.S. Pat. No. 5,535,019 to Eschbach suggests a conventional brightness level conversion method in which error diffusion threshold imprint values are generated in response to previously-output pixels. Where the multi-valued brightness level [x(k,l)] of a pixel at the position (k,l) is converted into a bi-valued brightness level, the weight sum of the error diffusion threshold imprint values generated using previously-output pixels is used in the calculation of a bi-valued threshold value [T(k,l)]. This conventional brightness level conversion method increases the amount of calculation in the process for generating error diffusion threshold imprint signals, and cannot provide uniform dot distribution because the relative positions between dots are not considered.

U.S. Pat. No. 6,160,921 to Gabriel G. Marcu discloses a conventional brightness level conversion method in which a minimum range where no black dots or white dots must exist around the position (m,n) is set depending on the value of x(m,n). If the multi-valued brightness level [x(m,n)] of an arbitrary pixel is greater than or equal to 128, it is checked whether black dots exist within a predetermined range. If no black dots exist, y(m,n) is binarized to black. If black dots exist, y(m,n) is binarized to white. On the other hand, if [x(m,n)] is less than 128, it is checked whether white dots exist within a predetermined range. If no white dots exist, y(m,n) is binarized to white. If white dots exist, y(m,n) is binarized to black. This conventional brightness level conversion method fixes the relative position between adjacent dots, thus including the problem that output image data converted from input image data having identical brightness levels gain a single pattern. The eyes of a human easily recognize this binarized output image data formed in a single pattern, resulting in an unnatural feeling.

U.S. Pat. No. 5,917,614 to Raphael L Levien discloses another conventional brightness level conversion method that previously determines an optimum distance between dots according to x(m,n). If x(m,n) is greater than or equal to 128, a distance between a black dot for x(m,n) and its most adjacent black dot is calculated. If x(m,n) is less than 128, a distance between a white dot for x(m,n) and its most adjacent white dot is calculated. The difference between the calculated distance and a predetermined distance is weighted to change a bi-valued threshold value. In this conventional brightness level conversion method, as x(m,n) approaches 128, a number of black or white dots increases, such that the optimum distance between dots decreases. Accordingly, the relative position between dots is limited on a digital lattice, resulting in a pattern unpleasant to the eyes. Where a dark multi-valued brightness level having an optimum distance a is converted into a bright multi-valued brightness level having an optimum distance b, a dot for an input pixel with a right multi-valued brightness level is binarized to be isolated by the optimum distance b from neighboring dots. Around where a dark multi-valued brightness level changes to a bright multi-valued brightness level, this conventional brightness level conversion method does not generate dots within the optimum distance b, thus producing a void region, which degrades an image quality of output image data.

SUMMARY OF THE INVENTION

To solve the above-described and other problems, an object of the present invention is to provide an image brightness level conversion method which provides an excellent image quality by converting a multi-valued brightness level to a bi-valued brightness level using a threshold value obtained in consideration of various factors of degrading the quality of the image.

Another object of the present invention is to provide an image brightness level conversion apparatus which provides an excellent image quality by converting a multi-valued brightness level to a bi-valued brightness level using a threshold value obtained in consideration of various factors of degrading the quality of the image.

Additional objects and advantages of the invention will be set forth in part in the description which follows, and, in part, will be obvious from the description, or may be learned by practice of the invention.

In order to achieve the above and other objects of the present invention, the image brightness level conversion method is implemented by determining whether an input pixel belongs to an edge area. Then, a predetermined reasonable distance by which dots should be isolated is decreased by a first noise component, if it is determined that the input pixel belongs to the edge area. If the input pixel belongs to the edge area, a threshold value is produced using the decreased distance. If it is determined that the input pixel does not belong to the edge area, the threshold value is produced without using the first noise component. Each of the dots may have the converted bi-valued brightness level.

In order to further achieve the above and other objects of the present invention, an image brightness level conversion apparatus comprises an edge checking unit and a threshold value producing unit. The edge checking unit checks from present and previous bi-valued brightness levels whether the input pixel corresponding to the current bi-valued brightness level belongs to an edge area. The threshold value producing unit decreases a predetermined reasonable distance, by which dots should be isolated, by a first noise component to thereby produce the threshold value in consideration of the decreased dot distance, in response to the result of the check made by the edge checking unit. Each of the dots may have the converted bi-valued brightness level.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
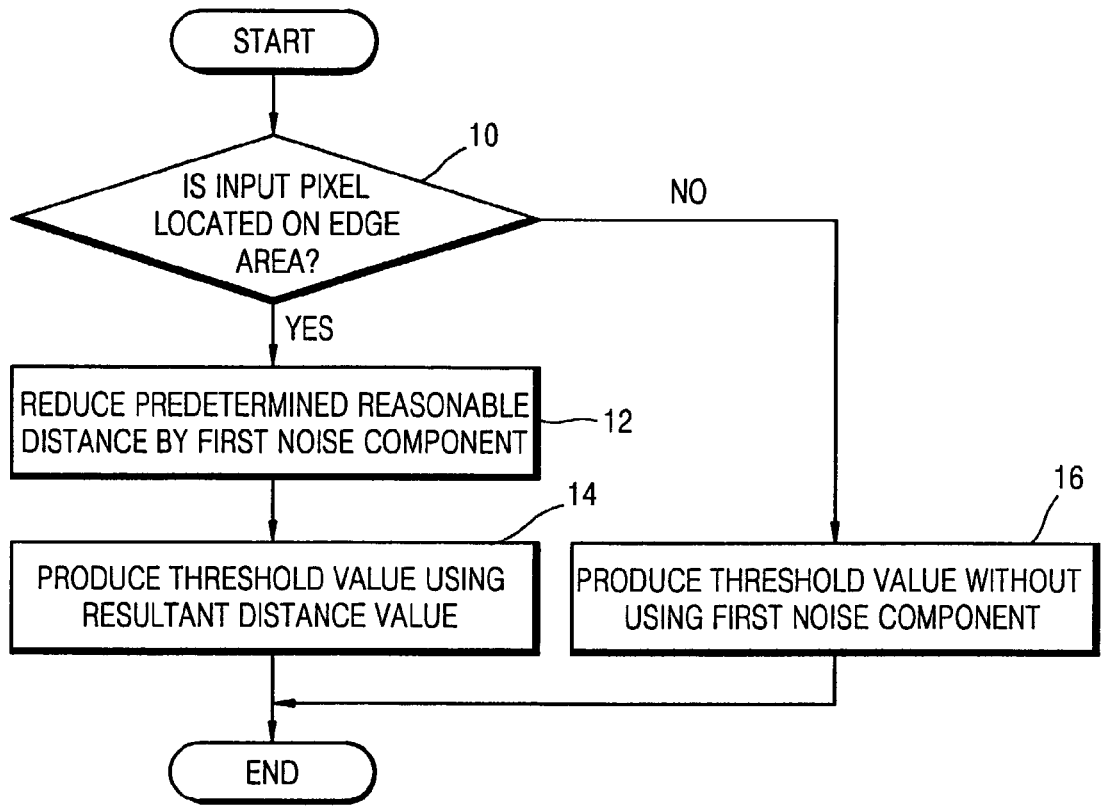
FIG. 1 is a flowchart illustrating a threshold value producing process in an image brightness level conversion method according to the present invention.

Reference will now be made in detail to the present embodiments of the present invention, examples of which are illustrated in the accompanying drawings, wherein like reference numerals refer to like elements throughout.

Referring to FIG. 1, a threshold value generation process comprises operations 10, 12, 14 and 16 in which a threshold value is produced depending on whether an input pixel is located on an edge area.

Figure 2:
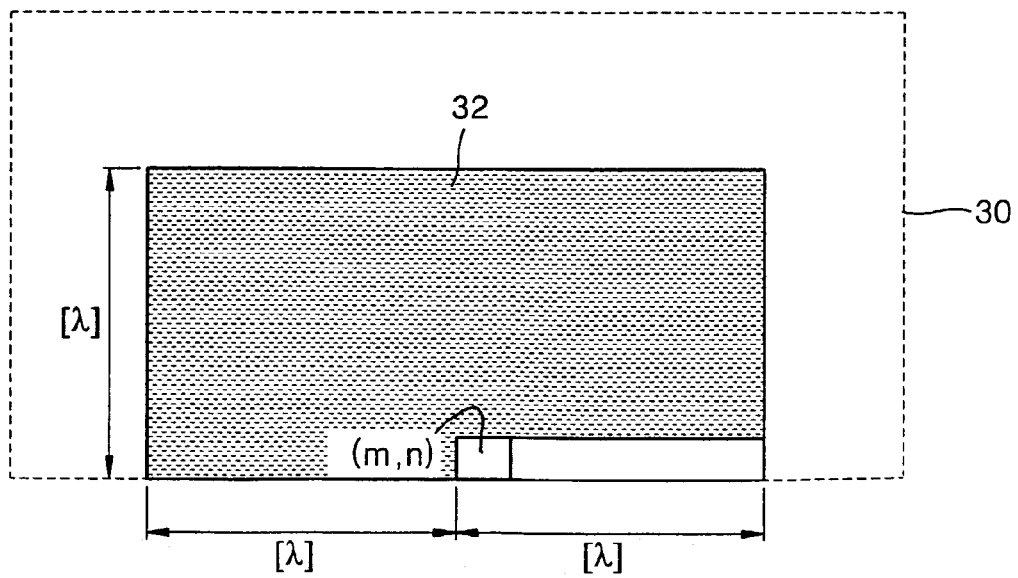
FIG. 2 shows an example of a local bitmap.

FIG. 2 shows an example of a local bitmap 30. Image brightness level conversion according to the present invention converts a multi-valued brightness level [x(m,n)] of an input pixel [(m,n)] (where, m and n denote horizontal and vertical positions, respectively, of a dot for the input pixel) into a bi-valued brightness level [y(m,n)] using a threshold value [T(m,n)].

In order to produce the threshold value [T(m,n)] used in the image brightness level conversion according to present invention, a determination is made whether the input pixel [(m, n)] is located on the edge area, in operation 10. Here, the edge area denotes an area where brightness changes drastically. In order to perform the determination of operation 10, a determination is made whether a number of dots existing in a shaded area 32 defined by a predetermined reasonable distance λ on the local bitmap 30 of FIG. 2 made by current and prior bi-valued brightness levels is greater than or equal to a first predetermined value. Here, the first predetermined value is determined depending on a value of x(m,n), and the predetermined reasonable distance λ is also determined depending on the value of x(m,n). Accordingly, a size of the shaded area 32 is controlled according to x(m,n). Each dot has a converted bi-valued brightness level. For example, if x(m,n) is greater than or equal to 128, each dot is black, otherwise, if x(m,n) is less than 128, each dot is white.

If it is determined in operation 10 that the number of dots existing in the shaded area 32 defined by the predetermined reasonable distance λ on the local bitmap 30 is greater than or equal to the first predetermined value, the input pixel is determined to be located on the edge area, otherwise, the input pixel is determined not to be located on the edge area. Where the input pixel is determined to be located on the edge area, the predetermined reasonable distance λ between dots is reduced by a first noise component $d_{swing}$, in operation 12 to obtain a resultant (reduced) distance value. After operation 12, a threshold value [T(m,n)] is obtained using the resultant distance value, in operation 14, as shown in Equation 1:

$$T(m,n) \propto t(m,n) \qquad (1)$$

wherein t(m,n) is $\alpha(d_{min}-(\lambda-d_{swing}))$ where α denotes a first weight value. If x(m,n) is greater than or equal to a second predetermined value, for example, 128, α is positive, otherwise, if x(m,n) is less than the second predetermined value, α is negative. A distance between a dot for the input pixel and a dot most adjacent to the input pixel is denoted by $d_{min}$. If x(m,n) is greater than or equal to the second predetermined value, $d_{min}$ denotes the distance from the dot for the input pixel at the position (m,n) to a black dot closest to the position (m,n), otherwise, if x(m,n) is less than the second predetermined value, $d_{min}$ denotes the distance from the dot for the input pixel to a white dot closest to the position (m,n).

Figure 3:
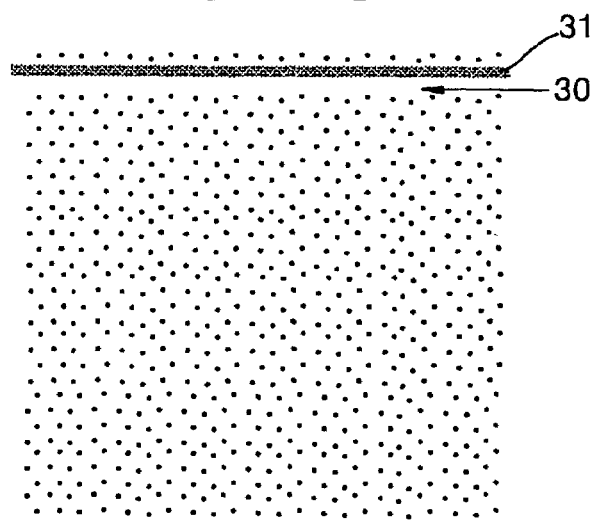
FIG. 3 shows an example of an output image binarized from an input image having a background multi-valued brightness level of 252 and a boundary line multi-valued brightness level of 128.

FIG. 3 shows an example of an output image binarized from an input image having a background multi-valued brightness level of 252 and a boundary line multi-valued brightness level of 128. For example, if an average brightness level (g) of a binarized output image is greater than or equal to 128, black dots for an output image should be isolated from each other at regular intervals of the predetermined reasonable distance λ so that the black dots are uniformly distributed on a 2-dimensional space. Likewise, if the average brightness level (g) of a binarized output image is less than 128, white dots for an output image should be isolated from each other at regular intervals of the predetermined reasonable distance λ so that the white dots are uniformly distributed on a 2-dimensional space. The dots may be isolated from each other by the predetermined reasonable distance λ at a maximum by converting a multi-valued brightness level to a bi-valued brightness level using a threshold value [T(m,n)] proportional to $\alpha(d_{min}-\lambda)$, that is, using a threshold value [T(m,n)] changed by weighting the real distance $d_{min}$ with the predetermined reasonable distance λ. However, a void region 30 having no dots may appear on the edge area where brightness changes rapidly, as shown in FIG. 3, because of binarization performed to isolate a dot for a current pixel from neighboring dots by the predetermined reasonable distance λ upon converting the multi-valued brightness level of the pixel present under a boundary line 31 into a bi-valued brightness level.

In order to reduce the void region 30, the predetermined reasonable distance λ is reduced by the first noise component $d_{swing}$ where an input pixel belongs to the edge area, as expressed in Equation 1, and a threshold value [T(m,n)] is produced using the reduced reasonable distance $(\lambda-d_{swing})$. Then, the multi-valued brightness level [x(m,n)] is converted into the bi-valued brightness level [y(m,n)] using the produced threshold value [T(m,n)], resulting in a reduction of the void region 30 having no dots around the edge area where an edge like a boundary line exists.

Embodiments according to the present invention with respect to the operation 14 of FIG. 1 will now be described with reference to the attached drawings.

According to an embodiment of the present invention, a threshold value [T(m,n)] is producible by synthesizing t(m, n) and a second noise component [n(m,n)]. If an intermediate multi-valued brightness level rather than a bright multi-valued brightness level or a dark multi-valued brightness level is converted into a bi-valued brightness level, a distance between dots decreases. In practice, an ideal predetermined reasonable distance λ between dots corresponding to pixels with multi-valued brightness levels in the range of 64 to 192 lies between 1.414 and 2 units. For example, if an image is to be printed with a horizontal resolution of 600 dpi and a vertical resolution of 600 dpi, a unit is 1/600 of an inch. The actual distance calculated on a digital lattice only has a limited value. Accordingly, it is impossible to binarize a multi-valued brightness level to a bi-valued brightness level so that the reduced distance between dots becomes the ideal predetermined reasonable distance λ. The conversion of an intermediate multi-valued brightness level into a bi-valued brightness level makes an output image have a particular pattern unpleasant to the eyes. That is, the short isolation distance between dots limits a relative position between dots, leading to repetition of a particular pattern.

In order to reduce generation of repetitive patterns, a second noise component [n(m,n)] is used in the production of a threshold value [T(m,n)]. Here, the second noise component [n(m,n)] can be produced using the position (m,n) of a dot corresponding to an input pixel. For example, if x(m, n) under binarization is greater than 128, Noise (m, n) and Noise ($m_0$, $n_0$) are calculated according to the following manner, wherein noise array has a size of M×N and each component has a value ranging from 0 to 255. Noise(m, n) is calculated from the predetermined noise array Noise_Array:

Noise_Array=Noise_Array(m mod M, n mod N), where Noise_Array has the size of M×N and (m, n) is the location under binarization. Noise ($m_0$, $n_0$) is calculated from the predetermined noise array, Noise_Array.

Noise (m,n)=Noise_Array($m_0$ mod M, $n_0$ mod N), where ($m_0$, $n_0$) is the location of the nearest black dot from (m,n).

Noise n(m,n)=[Noise(m,n)−Noise($m_0$,$n_0$)]×scaling_factor, where scaling_factor is a constant greater than 1.

If x(m, n) is less than 128 n(m, n) is calculated in like manner as described above except that (m0, n0) is the location of the nearest white dot from (m, n).

According to another embodiment of the present invention, the threshold value [T(m,n)] is producible by synthesizing t(m,n), the second noise component [n(m,n)] and a diagonal component reduction value [d(m,n)]. A diagonal alignment of dots is representative of patterns that degrade the visual image quality. According to the present invention, a diagonal pattern in which dots on a diagonal line are continuously white or black is reduced by synthesizing the diagonal component reduction value [d(m,n)] upon generation of the threshold value [T(m,n)]. Here, the diagonal component reduction value [d(m,n)] is determinable using bi-valued brightness levels of dots on a diagonal line or a vertical line, the second predetermined value and the multi-valued brightness level [x(m,n)].

Figure 4A:
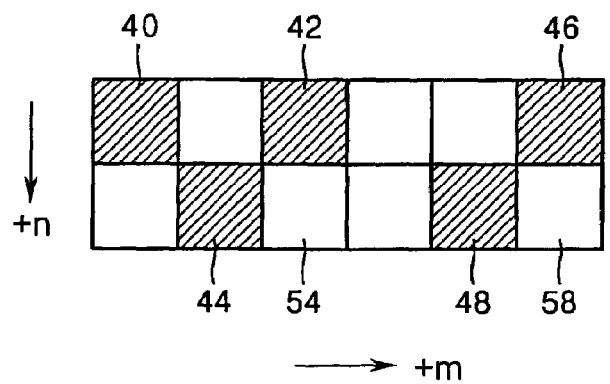
FIG. 4A shows an example view for illustrating a reduction of a diagonal pattern upon producing a threshold value in consideration of a diagonal component reduction value.
Figure 4B:
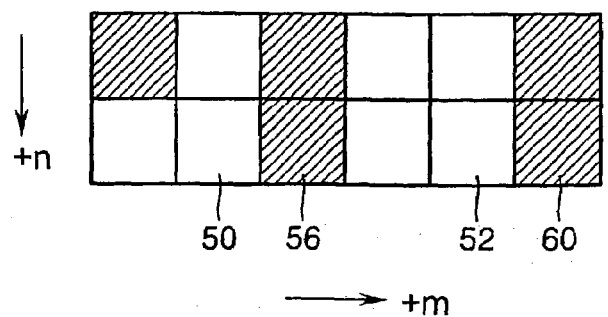
FIG. 4B shows another example view for illustrating a reduction of a diagonal pattern upon producing a threshold value in consideration of a diagonal component reduction value.

FIGS. 4A and 4B are example views for illustrating a reduction of the diagonal pattern upon production of a threshold value in consideration of a diagonal component reduction value. For example, if it is determined from the result of analysis of the bi-valued brightness levels of dots on diagonal lines that the dots on diagonal lines have the same color, the brightness level conversion method according to the present invention determines the diagonal component reduction value [d(m,n)] according to Equation 2:

$$d(m,n)=-\beta \qquad (2)$$

wherein, if the multi-valued brightness level [x(m,n)] is greater than or equal to the second predetermined value, e.g., 128, β is positive, and otherwise, β is negative. For example, β may be +20 or −20. The determined diagonal component reduction value [d(m,n)] is synthesized with t(m,n) and the second noise component [n(m,n)] to thus produce a threshold [T(m,n)].

Suppose the position of a dot corresponding to an input pixel is the position (m,n) 44 shown in FIG. 4A. If the dots (m−1, n−1) 40 and (m+1,n−1) 42 on the diagonal lines of the dot (m,n) 44 are all black like the dot (m,n), the diagonal component reduction value [d(m,n)] determined according to Equation 2 is added to the threshold value [T(m,n)]. Thus, the threshold value [T(m,n)] is reduced, which increases the probability that the dot 44 is binarized to a white dot 50 as shown in FIG. 4B. Although the threshold value [T(m,n)] is reduced, the black dot 44 does not necessarily become the white dot 50 but the probability of the dot 44 becoming the white dot 50 increases. In the same manner as above, if dots 46 and 48 of FIG. 4A on a diagonal line are all black, the diagonal component reduction value [d(m,n)] determined according to Equation 2 is added to the threshold value [T(m,n)]. Thus, the probability of binarizing the black dot 48 of FIG. 4A to a white dot 52 as shown in FIG. 4B increases.

If the dots on a vertical line have different colors, the brightness level conversion method according to the present invention determines the diagonal component reduction value [d(m,n)] according to Equation 3:

$$d(m,n)=\beta \quad (3)$$

The determined diagonal component reduction value [d(m,n)] is synthesized with t(m,n) and the second noise component [n(m,n)] to thus produce the threshold [T(m,n)].

Suppose the position of a dot corresponding to an input pixel (m,n) is the position 54 shown in FIG. 4A, if the dot (m,n−1) 42 on the vertical line of the dot (m,n) 54 is white (instead of black as shown in FIG. 4A), the diagonal component reduction value [d(m,n)] determined according to Equation 3 is added to the threshold value [T(m,n)]. Thus, the threshold value [T(m,n)] increases, which causes an increase in the probability that the dot 54 is binarized to a black dot 56 of FIG. 4B instead of the white dot 54 of FIG. 4A. Likewise, as the dots 46 and 58 of FIG. 4A have different colors, the diagonal component reduction value [d(m,n)] determined according to Equation 3 is added to the threshold value [T(m,n)], thus increasing the probability of binarizing the white dot 58 of FIG. 4A to a black dot 60 as shown in FIG. 4B. The diagonal component reduction value [d(m,n)] obtained according to Equation 3 induces the dots on a vertical line to have the same color, which indirectly decreases the likelihood that the dots on a diagonal line have the same color.

However, where the dots on a vertical line have the same color and, at the same time, the dots on a diagonal line have different colors, a diagonal component reduction value [d(m,n)] is determined as shown in Equation 4:

$$d(m,n)=0 \quad (4)$$

That is, a threshold value [T(m,n)] is produced without considering the diagonal component reduction value [d(m,n)].

Figure 5A:
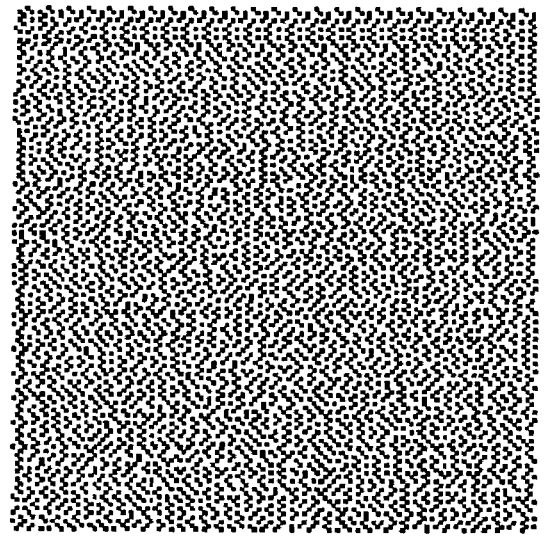
FIG. 5A shows an output image having bi-valued brightness levels obtained by a conventional image brightness level conversion method.
Figure 5B:
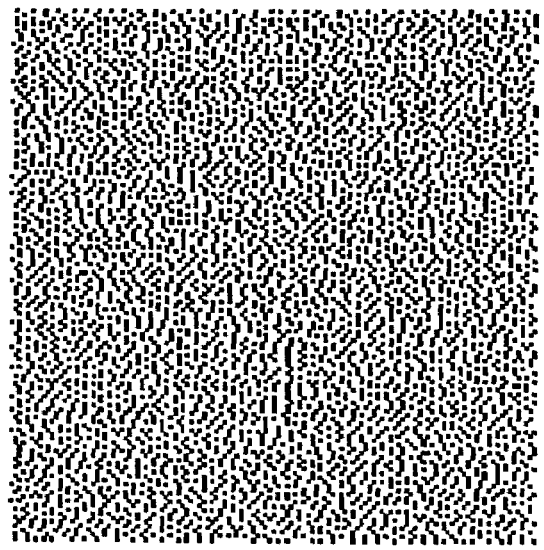
FIG. 5B shows an output image having bi-valued brightness levels obtained by the image brightness level conversion method according to the present invention.

FIGS. 5A and 5B show output images having bi-valued brightness levels obtained by a conventional image brightness level conversion method and an image brightness level conversion method according to the present invention, respectively. As shown in FIG. 5A, we can find that an output image produced by a conventional brightness level conversion method has a diagonal pattern because the dots on a diagonal line have the same color. However, as shown in FIG. 5B, we can find from an output image obtained by an image brightness level conversion method according to the present invention that the diagonal pattern, in which the dots on a diagonal line continuously have the same color, decreased and the vertical pattern, in which the dots on a vertical line continuously have the same color, increased.

According to still another embodiment of the present invention, the threshold value [T(m,n)] can be produced by synthesizing t(m,n), the second noise component [n(m,n)], the diagonal component reduction value [d(m,n)] and the second predetermined value as shown in Equation 5:

$$T(m,n)=\text{second predetermined value}+t(m,n)+n(m,n)+d(m,n) \quad (5)$$

Referring again to FIG. 1, if it is determined in operation 10 that an input pixel is not located on the edge area, the threshold value [T(m,n)] is produced without considering the first noise component $d_{swing}$, in operation 16.

Accordingly, the brightness level conversion method according to the present invention produces a threshold value [T(m,n)] by synthesizing t(m,n) with at least one of a second noise component [n(m,n)], a diagonal component reduction value [d(m,n)] and a second predetermined value. After the production of the threshold value, a multi-valued brightness level [x(m,n)] is converted into a bi-valued brightness level [y(m,n)] using the threshold value [T(m,n)] produced as described above.

Figure 6:
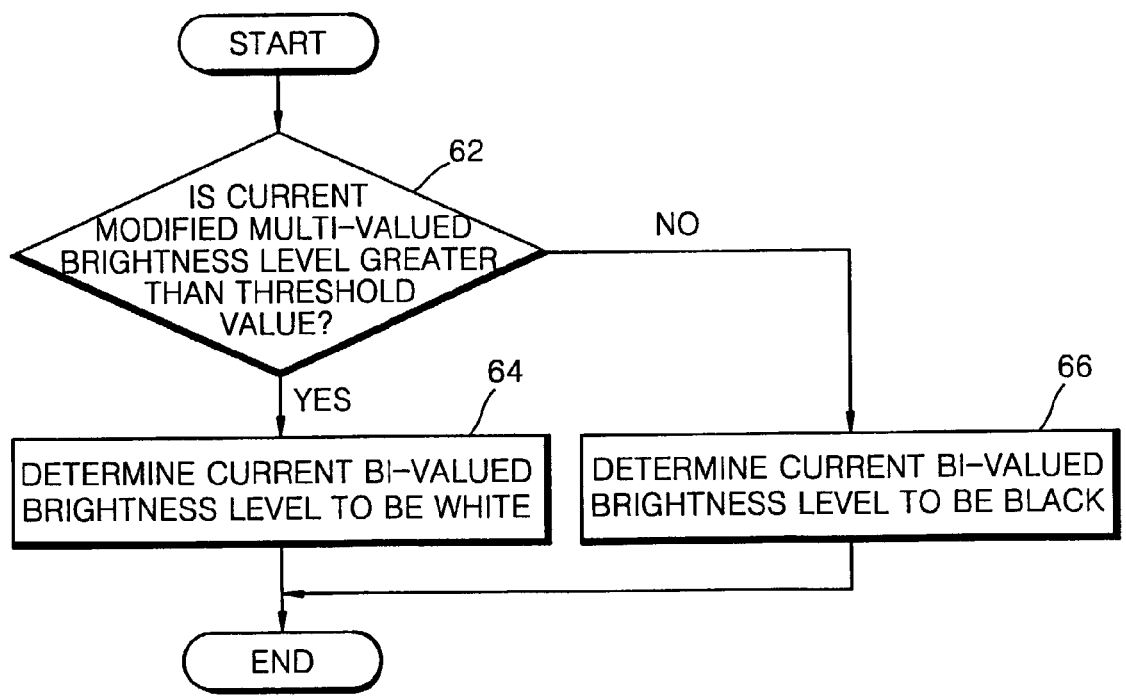
FIG. 6 is a flowchart illustrating a bi-valued brightness level determination process in the image brightness level conversion method according to the present invention.

FIG. 6 is a flowchart illustrating a process of determining a bi-valued brightness level [y(m,n)] in an image brightness level conversion method according to the present invention. The determination of the bi-valued brightness level [y(m,n)] is performed through operations 62, 64 and 66 in which the bi-valued brightness level [y(m,n)] is determined to be white or black depending on a result of comparison of a current modified multi-valued brightness level with a threshold value [T(m,n)].

After the operation 14 or 16 of FIG. 1, a determination is made in operation 62 whether the current modified multi-valued brightness level of an input pixel is greater than the threshold value [T(m,n)] obtained in operation 14 or 16. Here, the current modified multi-valued brightness level is obtained using an error value between the previous bi-valued brightness level and the previous modified multi-valued brightness level. The error value is determined according to Equation 6:

$$e(m,n)=u(m,n)-y(m,n) \quad (6)$$

wherein e(m,n) denotes the error value, y(m,n) denotes the previous bi-valued brightness level, and u(m,n) denotes the previous modified multi-valued brightness level. The current modified multi-valued brightness level [u(m,n)] is obtainable according to Equation 7:

$$u(m,n) = x(m,n) + \sum_{(k,l)\in R} W(k,l)\cdot e(m-k,n-l) \quad (7)$$

wherein, where the error value [e(m,n)] is propagated to pixels around a pixel corresponding to the position (m,n), W(k,l) denotes a second weight value, which is applied to the error value [e(m,n)], within a predetermined region R centered on the position (m,n). The weight value W(k,l) in Equation (7) has a form of a pair of integers which define a displacement from the position (m, n). For example, where (k,l) equals (m−1,n−1), (m, n−1), (m+1, n−1), (m−1, n), W(k,l) equals 1/16, 5/16, 3/16, 7/16, respectively. The region R may be expressed as a region including pairs of the integers such as for example (1,1), (0,1), (−1,1) and (−1,0)

If it is determined in operation 62 that the current modified multi-valued brightness level [u(m,n)] expressed in Equation 7 is greater than the threshold value [T(m,n)], a current bi-valued brightness level is determined to be white, in operation 64. On the other hand, if it is determined in operation 62 that the current modified multi-valued brightness level [u(m,n)] is smaller than or equal to the threshold value [T(m,n)], a current bi-valued brightness level is determined to be black, in operation 66. In other words, where a multi-valued brightness level ranges from 0 to 255, if it is determined that the current modified multi-valued brightness level is greater than the threshold value [T(m,n)], a current bi-valued brightness level is determined to be '255', otherwise, the current bi-valued brightness level is determined to be '0'.

The configuration and operation of an image brightness level conversion apparatus according to the present invention, which performs the above-described image brightness level conversion method, will now be described with reference to FIG. 7.

Figure 7:
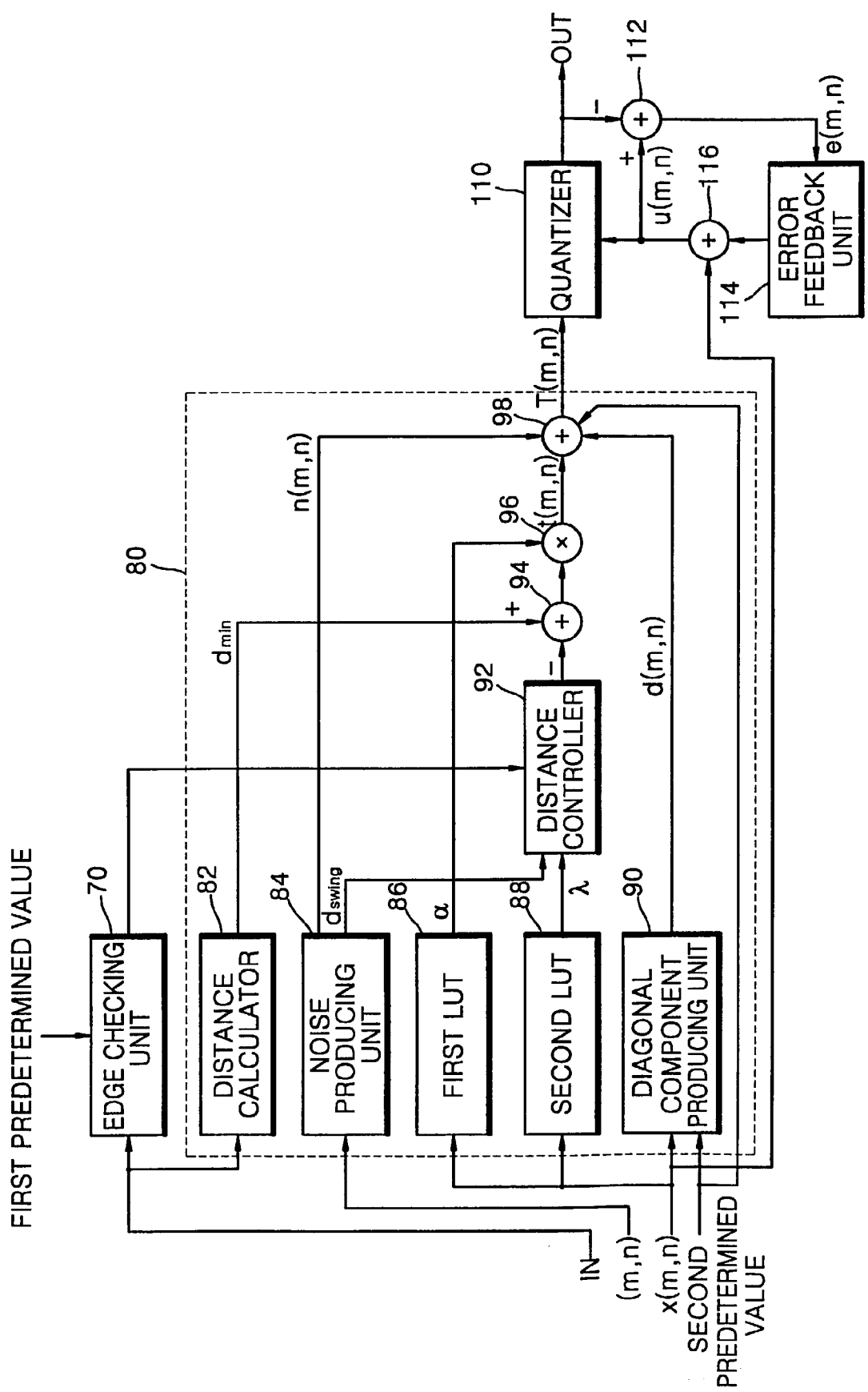
FIG. 7 is a block diagram of an image brightness level conversion apparatus according to the present invention.

FIG. 7 is a block diagram of an image brightness level conversion apparatus according to the present invention. The apparatus comprises an edge checking unit 70, a threshold value producing unit 80, a quantizer 110, an adder 116, a subtractor 112 and an error feedback unit 114.

The edge checking unit 70 of FIG. 7 performs the operation 10 of FIG. 1 by checking whether an input pixel corresponding to a current bi-valued brightness level is placed on the edge area, using the current and previous bi-valued brightness levels received via an input port IN, and outputs a result of the checking to the threshold value producing unit 80. Here, the current and previous bi-valued brightness levels may be input from a local bit map buffer (not shown), which buffers, for example, current and previous bi-valued brightness levels as shown in FIG. 2 generated by the apparatus of FIG. 7. The edge checking unit 70 compares a number of dots existing within the region 32, defined by the predetermined reasonable distance λ, on the local bitmap 30 of FIG. 2 received through the input port IN after having been buffered by the local bitmap buffer, with a first predetermined value. The edge checking unit 70 outputs a result of the comparison so that the result of the comparison serves as the result of the checking.

The threshold value producing unit 80 performs the operation 12 of FIG. 1 by reducing a predetermined reasonable distance λ, by which dots should be isolated from each other, by a first noise component $d_{swing}$ in response to the result of the checking made by the edge checking unit 70. The threshold value producing unit 80 also performs the operation 14 of FIG. 1 by producing a threshold value [T(m,n)] in consideration of the reduced distance (λ−$d_{swing}$). Or, in response to the result of the checking made by the edge checking unit 70, the threshold value producing unit 80 performs the operation 16 of FIG. 1 by producing a threshold value [T(m,n)] in consideration of the predetermined reasonable distance λ without reducing the predetermined reasonable distance λ. In order to accomplish this operation, the threshold value producing unit 80 comprises a distance calculator 82, a noise producing unit 84, a first look up table (LUT) 86, a second LUT 88, a distance controller 92, a subtractor 94 and a multiplication unit 96 and may further comprise a diagonal component producing unit 90 and an adder 98.

The noise producing unit 84 in the threshold value producing unit 80 produces the first noise component $d_{swing}$ and outputs the produced first noise component $d_{swing}$ to the distance controller 92. The first LUT 86 reads a first weight value α corresponding to a multi-valued brightness level [x(m,n)] and outputs the read first weight value α to the multiplication unit 96. The second LUT 88 reads a predetermined reasonable distance λ corresponding to the multi-valued brightness level [x(m,n)] and outputs the read predetermined reasonable distance λ to the distance controller 92.

The distance controller 92 reduces the predetermined reasonable distance λ input from the second LUT 88 by the first noise component $d_{swing}$ in response to the result of the checking made by the edge checking unit 70, and outputs the reduced distance to the subtractor 94. That is, where the distance controller 92 recognizes from the result of the checking made by the edge checking unit 70 that the input pixel is located on the edge area, the distance controller 92 reduces the predetermined reasonable distance λ by the first noise component $d_{swing}$ and outputs the reduced distance to the subtractor 94. However, where the distance controller 92 recognizes from the result of the checking made by the edge checking unit 70 that the input pixel is not located on the edge area, the distance controller outputs the predetermined reasonable distance λ received from the second LUT 88 to the subtractor 94 without any reduction of the distance λ.

The distance calculator 82 in the threshold value producing unit 80 calculates the distance $d_{min}$ between a dot for an input pixel with a current bi-valued brightness level and a most adjacent dot for the input pixel using the current and previous bi-valued brightness levels received via the input port IN and outputs the calculated distance $d_{min}$ to the subtractor 94. The subtractor 94 subtracts the output of the distance controller 92 from the distance $d_{min}$ received from the distance calculator 82 and outputs the result of subtraction to the multiplication unit 96. The multiplication unit 96 multiplies the subtracted distance value received from the subtractor 94 by the first weight value α received from the first LUT 86 and outputs a result of the multiplication so that the result of the multiplication serves as the threshold value [T(m,n)]. That is, the distance calculator 82, the noise producing unit 84, the first and second LUTs 86 and 88, respectively, the distance controller 92, the subtractor 94 and the multiplication unit 96 shown in FIG. 7 operate to calculate t(m,n) of Equation 1.

In order to produce a threshold value [T(m,n)] by synthesizing t(m,n) and the second noise component [n(m,n)], the threshold value producing unit 80 may further comprise an adder 98. In this case, the noise producing unit 84 produces not only the first noise component $d_{swing}$ but also the second noise component [n(m,n)] corresponding to the position (m,n) of a dot for the input pixel, and outputs the produced second noise component [n(m,n)] to the adder 98. The adder 98 adds the received second noise component [n(m,n)] to the result of the multiplication made by the multiplication unit 96 and outputs a result of the addition so that the output result of the adder 98 serves as the threshold value [T(m,n)].

In order to produce the threshold value [T(m,n)] by synthesizing t(m,n), the second noise component [n(m,n)] and a diagonal component reduction value [d(m,n)], the threshold value producing unit 80 may further comprise a diagonal component producing unit 90. In this case, the diagonal component producing unit 90 compares the multi-valued brightness level [x(m,n)] to a second predetermined value in order to determine whether β is to be positive or negative, produces a diagonal component reduction value [d(m,n)] according to Equation 2, 3 or 4 depending on a result of the comparison, and outputs the produced diagonal component reduction value [d(m,n)] to the adder 98. Here, the diagonal component producing unit 90 produces a diagonal component reduction value [d(m,n)] using the current and previous bi-valued brightness levels of dots on a diagonal line and the current and previous bi-valued brightness levels of the dots on a vertical line. The adder 98 adds the diagonal component reduction value [d(m,n)] received from the diagonal component producing unit 90 to the second noise component [n(m,n)] received from the noise producing unit 84 and the result of the multiplication made by the multiplication unit 96, and outputs a result of the addition as the threshold value [T(m,n)].

In order to produce a threshold value [T(m,n)] by synthesizing t(m,n), the second noise component [n(m,n)], the diagonal component reduction value [d(m,n)] and the second predetermined value, the adder 98 adds the second predetermined value to the diagonal component reduction value [d(m,n)] received from the diagonal component producing unit 90, the second noise component [n(m,n)] received from the noise producing unit 84, the result of the multiplication made by the multiplication unit 96 and outputs the result of the addition as a threshold value [T(m,n)].

In order to perform the image brightness level conversion method shown in FIG. 6, the image brightness level conversion apparatus of FIG. 7 may further comprise a quantizer 110, which compares the threshold value [T(m,n)] received from the threshold value producing unit 80 with a current modified multi-valued brightness level [u(m,n)] for the input pixel, determines a current bi-valued brightness level in response to the result of the comparison, and outputs the current bi-valued brightness level via an output port OUT. Here, the current bi-valued brightness output from the quantizer 110 level may be output to the above-described local bitmap buffer.

Here, the current modified multi-valued brightness level [u(m,n)] is produced using the subtractor 112, the error feedback unit 114 and the adder 116. The subtractor 112 subtracts the previous bi-valued brightness level output via the output port OUT from the previous modified multi-valued brightness level and outputs a result of the subtraction to the error feedback unit 114 so that the result of the subtraction serves as an error value [e(m,n)]. As expressed in Equation 7, the error feedback unit 114 multiplies the received error value [e(m,n)] by a second weight value [W(k,l)], synthesizes the result of the multiplication and outputs a result of the synthesis to the adder 116. The adder 116 adds the synthesis the result received from the error feedback unit 114 to the current multi-valued brightness level [x(m,n)] and outputs a result of the addition to the quantizer unit 110 so that the addition result serves as the current modified multi-valued brightness level [u(m,n)].

Figure 8A:
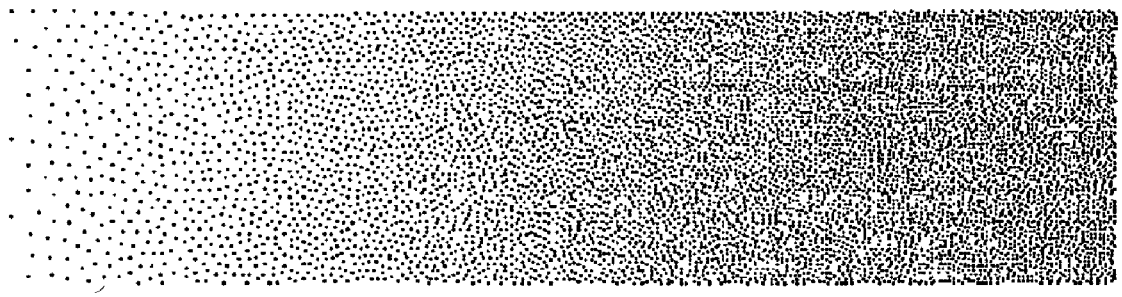
FIG. 8A shows an output image obtained where a conventional image brightness level conversion method is applied to a lamp image with a brightness level in the range of 128 to 255.
Figure 8B:
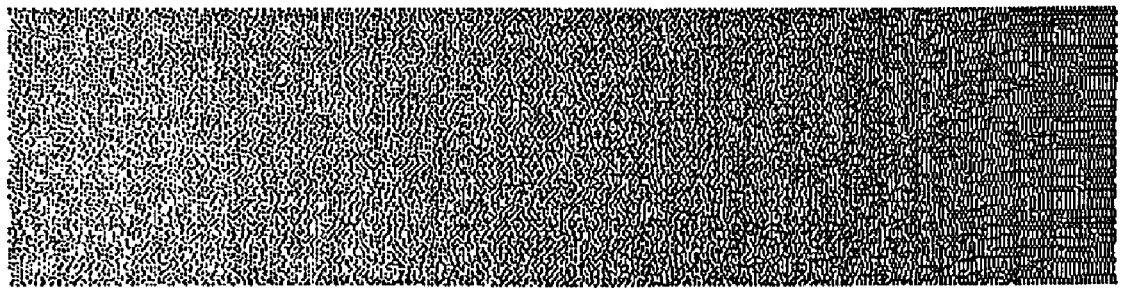
FIG. 8B shows an output image obtained where the image brightness level conversion method according to the present invention is applied to a lamp image with a brightness level in the range of 128 to 255.

FIGS. 8A and 8B show output images obtained where a conventional image brightness level conversion method and an image brightness level conversion method according to the present invention, respectively, are applied to a lamp image with a brightness level in the range of 128 to 255. Where the conventional brightness level conversion method is applied to lamp images the brightness level of each of which varies sequentially, a binarized output image as shown in FIG. 8A is obtainable. Where the brightness level conversion method according to the present invention is applied to lamp images, a binarized output image as shown in FIG. 8B is obtainable. In contrast to the output image shown in FIG. 8A, the output image of FIG. 8B provides uniform distribution of dots at bright brightness levels and has far fewer unpleasant appearing dot patterns as the brightness level becomes darker.

As described above, in the image brightness level conversion method and apparatus according to the present invention, the distance between adjacent dots is determined to be a predetermined reasonable distance λ, resulting in a uniform distribution of dots on a 2-dimensional space. A threshold value is produced in consideration of a first noise component, depending on whether an input pixel belongs to an edge area like a boundary line, which decreases generation of a void region where no dots appear around the edge. The threshold value is also produced in consideration of a second noise component, thus reducing unpleasant appearing fixed patterns between dots. Production of the threshold value in consideration of a diagonal reduction component decreases generation of a fixed pattern in which dots with the same color are diagonally arrayed. This leads to an improvement in the error distribution method of Floyd and Steinberg, which is representative of conventional brightness level conversion methods. Therefore, the image brightness level conversion method and apparatus according to the present invention provides a visually excellent image quality.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of converting a multi-valued brightness level of an input pixel to a bi-valued brightness level using a threshold value, the method comprising;

determining whether the input pixel belongs to an edge area;

decreasing a predetermined distance by which dots are to be isolated by a first noise component and producing the threshold value using the decreased distance, in response to determining that the input pixel belongs to the edge area; producing the threshold value using the decreased distance; and producing the threshold value without using the first noise component in response to determining that the input pixel does not belong to the edge area, wherein each of the dots has the converted bi-valued brightness level.

2. The method of claim 1, further comprising:

determining the predetermined distance depending on the multi-valued brightness level of the input pixel.

3. The method of claim 1, wherein: the determining of whether the input pixel belongs to an edge area comprises:

determining whether a number of dots which exist on a local bitmap within a region having dimensions corresponding to the predetermined distance is greater than or equal to a first predetermined value, and, determining that the input pixel belongs to the edge area if the number of dots is determined to be greater than or equal to the first predetermined value.

4. The method of claim 3, further comprising:

determining the first predetermined value according to the multi-valued brightness level of the input pixel.

5. The method of claim 1, wherein the producing of the threshold value using the decreased distance comprises:

producing the threshold value according to the equation:

$$T(m,n) \propto t(m,n),$$

wherein T(m,n) denotes the threshold value, t(m,n) is $\alpha(d_{min} - (\lambda - d_{swing}))$, (m,n) denotes a position of the input pixel, α denotes a first weight value, λ denotes the predetermined distance, $d_{min}$ denotes the distance between a dot corresponding to the input pixel and a dot most adjacent to the input pixel, and $d_{swing}$ denotes the first noise component.

6. The method of claim 5, wherein the producing of the threshold value further comprises:

synthesizing t(m,n) and at least one of a second noise component n(m,n), a diagonal component reduction value d(m,n), and a second predetermined value, wherein:
the second noise component is produced using the position (m,n) of the input pixel,
the diagonal component reduction value is determined using the bi-valued brightness level of dots on diagonal lines, the second predetermined value and the multi-valued brightness level of the input pixel, and
the first weight value α is positive if the multi-valued brightness level of the input pixel is greater than or equal to the second predetermined value, and otherwise, the first weight value α is negative.

7. The method of claim 1, further comprising:
checking whether a current modified multi-valued brightness level of the input pixel is greater than the threshold value;
determining that a current bi-valued brightness level is white, if the checking determines that the current modified multi-valued brightness level is greater than the threshold value; and
determining that the current bi-valued brightness level is black, if the checking determines that the current modified multi-valued brightness level is smaller than or equal to the threshold value,
wherein the current modified multi-valued brightness level is produced using a current multi-valued brightness level and an error value between a previous bi-valued brightness level and the previous modified multi-valued brightness level.

8. The method of claim 7, wherein the current modified multi-valued brightness level [u(m,n)] is produced according to an equation:

$$u(m, n) = x(m, n) + \sum_{(k,l) \in R} W(k, l) \cdot e(m - k, n - l)$$

where x(m,n) denotes the current multi-valued brightness level, W(k,l) denotes a second weight value, (k, l) are pairs of integers, R represents a region centered on (m,n) and defined by pairs of integers, and e(m−k,n−k) denotes the error value.

9. An apparatus for converting a multi-valued brightness level of an input pixel to a bi-valued brightness level using a threshold value, the apparatus comprising:
an edge checking unit which checks present and previous bi-valued brightness levels whether the input pixel corresponding to a current bi-valued brightness level belongs to an edge area and outputs a checked result; and
a threshold value producing unit which decreases a predetermined distance by which dots are to be isolated by a first noise component to produce the threshold value in consideration of the decreased dot distance, in response to the checked result,
wherein each of the dots has the converted bi-valued brightness level.

10. The apparatus of claim 9, wherein the edge checking unit compares a number of dots existing within a region defined by dimensions corresponding to the predetermined distance on a local bitmap produced by the previous bi-valued brightness levels with a first predetermined value and outputs a result of the comparison as the checked result.

11. The apparatus of claim 9, wherein the threshold value producing unit comprises:
a noise producing unit which produces the first noise component;
a first look up table which reads out a first weight value corresponding to the multi-valued brightness level;
a second look up table which reads out the predetermined distance corresponding to the multi-valued brightness level;
a distance controller which reduces the predetermined distance received from the second look up table by the first noise component in response to the result of the check made by the edge checking unit and outputs a result of the reduction;
a distance calculator which calculates a distance between a first dot with the current bi-valued brightness level corresponding to the input pixel and a second dot which is most adjacent to the first dot using the current and previous bi-valued brightness levels;
a first subtractor which subtracts the reduced distance received from the distance controller from the distance calculated by the distance calculator and outputs a difference result; and
a multiplication unit which multiplies the difference result output by the first subtractor by the first weight value read out from the first look up table and outputs a multiplication result as the threshold value.

12. The apparatus of claim 11, wherein:
the threshold value producing unit further comprises a first adder which adds the multiplication result output by the multiplication unit to a second noise component and outputs an added result as the threshold value, and
the noise producing unit produces the second noise component corresponding to a position (m,n) of a dot for the input pixel.

13. The apparatus of claim 12, wherein:
the threshold value producing unit further comprises a diagonal component producing unit which compares the multi-valued brightness level with a second predetermined value to produce a diagonal component reduction value in response to the result of the comparison and the current and previous bi-valued brightness levels of dots on diagonal lines or the current and previous bi-valued brightness levels of dots on vertical lines, and
the first adder sums the diagonal component reduction value, the second noise component and the multiplication result of the multiplication unit and outputs an added result as the threshold value.

14. The apparatus of claim 13, wherein the first adder sums the diagonal component reduction value, the second noise component, the multiplication result of the multiplication unit and the second predetermined value and outputs the sum as the threshold value.

15. The apparatus of claim 9, further comprising:
a quantizer which:
compares a current modified multi-valued brightness level of the input pixel with the threshold value, to determine a current bi-valued brightness level in response to a result of the comparison, and
outputs the determined current bi-valued brightness level, wherein the current modified multi-valued brightness level is produced from a previous multi-valued bright ness level and an error value between a previous modified multi-valued brightness level and a previous bi-valued brightness level.

16. The apparatus of claim 15, further comprising:
a second subtractor which subtracts the previous bi-valued brightness level from the previous modified multi-valued brightness level and outputs a subtraction result as the error value;
an error feedback unit which multiplies the error value by a second weight value and synthesizes a result of the multiplication; and
a second adder which adds the synthesized result to the current multi-valued brightness level and outputs the an addition result to the quantizer as the current modified multi-valued brightness level.

* * * * *